US012170405B2

(12) United States Patent
Johansson et al.

(10) Patent No.: US 12,170,405 B2
(45) **Date of Patent: *Dec. 17, 2024**

(54) CAVITY-BACKED ANTENNA ELEMENT AND ARRAY ANTENNA ARRANGEMENT

(71) Applicant: Telefonaktiebolaget LM Ericsson (publ), Stockholm (SE)

(72) Inventors: Stefan Johansson, Romelanda (SE); Hawal Rashid, Kungälv (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 17 days.

This patent is subject to a terminal disclaimer.

(21) Appl. No.: 18/092,979

(22) Filed: Jan. 4, 2023

(65) Prior Publication Data

US 2023/0223705 A1 Jul. 13, 2023

Related U.S. Application Data

(63) Continuation of application No. 17/052,576, filed as application No. PCT/EP2018/061626 on May 4, 2018, now Pat. No. 11,552,411.

(51) Int. Cl.

*H01Q 21/00* (2006.01)
*H01Q 1/52* (2006.01)
*H01Q 9/04* (2006.01)

(52) U.S. Cl.

CPC ......... *H01Q 21/0025* (2013.01); *H01Q 1/523* (2013.01); *H01Q 9/0414* (2013.01); *H01Q 9/0435* (2013.01); *H01Q 9/045* (2013.01)

(58) Field of Classification Search

CPC .. H01Q 21/0025; H01Q 1/523; H01Q 9/0414; H01Q 9/0435; H01Q 9/045

See application file for complete search history.

(56) References Cited

U.S. PATENT DOCUMENTS 5,995,047 A 11/1999 Freyssinier et al.
9,929,472 B2 3/2018 Rojanski (Continued)

FOREIGN PATENT DOCUMENTS

CN 1726591 1/2006
WO H05-90803 4/1993

(Continued)

OTHER PUBLICATIONS

International Search Report and Written Opinion issued in International Application No. PCT/EP2018/061626 dated Jan. 25, 2019 (13 pages).

(Continued)

*Primary Examiner* — Anh Q Tran

(74) *Attorney, Agent, or Firm* — Rothwell, Figg, Ernst & Manbeck, P.C.

(57) ABSTRACT

The present disclosure relates to an antenna element comprising a lower conducting plane, an upper conducting plane and an upper dielectric layer structure that is positioned between the conducting planes. The upper dielectric layer structure comprises a plurality of conducting vias that electrically connect the conducting planes to each other and circumvent an upper radiating patch formed in, below or above the upper conducting plane. The conducting vias circumvent at least one intermediate radiating patch that is formed in the upper dielectric layer structure, and a lowest intermediate radiating patch that is closest to the lower conducting plane is connected to a feed arrangement that comprises at least one feeding probe that extends via a corresponding aperture in the lower conducting plane and is electrically connected to the lowest intermediate radiating patch.

18 Claims, 6 Drawing Sheets

(56) References Cited

U.S. PATENT DOCUMENTS

| | | | |
|---|---|---|---|
| 10,643,928 B2 | 5/2020 | Tuominen | |
| 10,720,716 B2 * | 7/2020 | Clemente | H01Q 3/46 |
| 11,158,948 B2 | 10/2021 | Lee | |
| 11,258,161 B2 * | 2/2022 | Moallem | H01Q 1/2283 |
| 2006/0044189 A1 | 3/2006 | Livingston | |
| 2006/0099742 A1 | 5/2006 | Hochstenbach et al. | |
| 2008/0218418 A1 | 9/2008 | Gillette | |
| 2010/0090903 A1 | 4/2010 | Byun | |
| 2013/0286611 A1 | 10/2013 | Droz | |
| 2016/0028162 A1 | 1/2016 | Ou et al. | |
| 2017/0229784 A1 | 8/2017 | Kitamura et al. | |
| 2017/0353338 A1 | 12/2017 | Amadjikpe et al. | |
| 2020/0235490 A1 | 7/2020 | Carceller | |

FOREIGN PATENT DOCUMENTS

| | | |
|---|---|---|
| WO | 2004-221964 | 8/2001 |
| WO | 2008069493 | 6/2008 |
| WO | 202977719 | 6/2013 |
| WO | 103262102 | 8/2013 |
| WO | 103904423 | 7/2014 |
| WO | 2015/083457 | 6/2015 |
| WO | 105703064 | 6/2016 |
| WO | 205542769 | 8/2016 |
| WO | 2017213772 | 12/2017 |
| WO | 2018/063497 | 4/2018 |
| WO | 2019/076928 | 4/2019 |

OTHER PUBLICATIONS

Amin Enayati et al., "An off-chip antenna for mm-wave applications", 7th European Conference on Antennas and Propagation (EUCAP 2013)—Convened Sessions, IEEE 2013, (pp. 332-335).

Mohammad Mosalanejad et al., "Millimeter Wave Cavity Backed Microstrip Antenna Array for 79 GHz Radar Applications", Progress in Electromagnetics Research, vol. 158, 2017 (pp. 89-98).

Li Yang et al., "3D Multilayer Integration and Packaging on Organic/Paper Low-cost Substrates for RF and Wireless Applications", IEEE, 2007 (pp. 267-270).

Awida, M.H., et al., "Design guidelines of substrate-integrated cavity-backed patch antennas", www.ietdl.org, IET Microw. Antennas Propag., vol. 6., Iss. 2, 2012 (pp. 151-157).

Emhemmed, A.S., et al., "Surface Waves Reduction in Microstrip Antennas", IEEE, 2013 (438-442).

Awida, M.H., et al., "Substrate-integrated Cavity-Backed Patch Arrays: A Low-Cost Approach for Bandwidth Enhancement", IEEE Transactions on Antennas and Propagation, vol. 59, No. 4, Apr. 2011 (pp. 1155-1163).

Pang, W., "A Design of Cavity Backed Slot Antenna Based on Substrate integrated Waveguide," Journal of Air Force Engineering University, Apr. 2014 (4 pages).

* cited by examiner

CAVITY-BACKED ANTENNA ELEMENT AND ARRAY ANTENNA ARRANGEMENT

CROSS-REFERENCE TO RELATED APPLICATIONS

This application is a continuation of U.S. application Ser. No. 17/052,576, filed on Nov. 3, 2020 (status pending), which is the 35 U.S.C. § 371 National Stage of International Patent Application No. PCT/EP2018/061626, filed May 4, 2018. The above identified applications are incorporated by this reference.

TECHNICAL FIELD

The present disclosure relates to an antenna element comprising a lower conducting plane, an upper conducting plane and an upper dielectric layer structure that is positioned between the conducting planes. The upper dielectric layer structure comprises a plurality of conducting vias that form a cavity.

BACKGROUND

In wireless communication networks there is radio equipment that in many cases comprises so-called advanced antenna system (AAS), for example 5G mobile communication system. AAS is a key component to improve capacity and coverage by making use of the spatial domain, and a challenge is to develop cost efficient technologies and building practice to meet market cost demands on this type of products.

In the mm-wave area, such as about 10 GHz and above, it is attractive using a highly integrated building practice based on multi-layer PCB (printed circuit board) or LTCC (low temperature cofired ceramics), or similar multi-layer technologies. Hence there is a need of antenna array designs that are suitable to be realized and produced in multi-layer technology.

Classical patch antennas printed on dielectric substrates suffer from excitation of substrate waves, which interferes with neighboring antenna elements in an antenna array system as well as causing edge effects. Cavity-backed patch antennas suppress substrate waves, since the cavity hinders the waves to propagate into the dielectric substrate, for example as described in "Millimeter Wave Cavity Backed Microstrip Antenna Array for 79 GHz Radar Applications", Mohammad Mosalanejad, Steven Brebels, Charlotte Soens, Ilja Ocket, Guy A. E. Vandenbosch, (Progress In Electromagnetics Research, Vol. 158, 89-98, 2017).

However, such wideband cavity backed patch antennas are limited by their deteriorating cross-polarization ratio, which is detrimental to the wideband dual polarized antenna array performance. Furthermore, the wideband cavity patch antenna also suffers from feed radiation, which causes among others asymmetry in the radiation pattern.

Aperture feeding of a cavity-backed microstrip patch antenna is described in "Millimeter Wave Cavity Backed Aperture Coupled Microstrip Patch Antenna" M. Mosalanejad, S. Brebels, I. Ocket, C. Soens, G. A. E. Vandenbosch, A. Bourdoux, (2016 10th European Conference on Antennas and Propagation (EuCAP), Davos, 2016, pp. 1-5). A disadvantage of aperture feeding, however, is that a cavity is required below the feeding aperture which in turn requires room in the PCB layers below the aperture. The thickness of the below PCB layers thus needs to be increased, and in these layers it will also be less available area for power distribution arrangements for feeding the antenna or antenna array.

There is thus a need for a cavity-backed patch antenna element where feed radiation is reduced, which results in a more symmetrical and better antenna radiation characteristic, and where cross-polarization radiation performance is improved, and an antenna array comprising such antenna elements.

SUMMARY

It is an object of the present disclosure to provide a cavity-backed patch antenna element where feed radiation is reduced, which results in a more symmetrical and better antenna radiation characteristics, and where cross-polarization radiation performance is improved. It is also an object of the present disclosure to provide an antenna array comprising such antenna elements.

Said object is obtained by means of an antenna element comprising a lower conducting plane, an upper conducting plane and an upper dielectric layer structure that is positioned between the conducting planes. The upper dielectric layer structure comprises a plurality of conducting vias that electrically connect the conducting planes to each other and circumvent an upper radiating patch formed in, below or above the upper conducting plane. The conducting vias circumvent at least one intermediate radiating patch that is formed in the upper dielectric layer structure. A lowest intermediate radiating patch that is closest to the lower conducting plane is connected to a feed arrangement that comprises at least one feeding probe that extends via a corresponding aperture in the lower conducting plane and is electrically connected to the lowest intermediate radiating patch.

This provides advantages related to providing antenna radiation characteristics and cross-polarization radiation performance that are improved compared to prior art, further enabling reduced feed radiation.

According to some aspects, the upper dielectric structure comprises a separate dielectric layer formed for each radiating patch.

This provides an advantage of an efficient building structure.

According to some aspects, the upper conducting plane comprises an electrically conducting frame to which the vias are connected.

This provides an advantage of having an efficient connection between the vias.

According to some aspects, each feed arrangement is connected to a power distribution arrangement that extends in a lower dielectric layer structure, where the lower conducting plane is positioned between the upper dielectric layer structure and the lower dielectric layer structure.

This provides an advantage of preventing undesired radiation from the power distribution arrangement.

According to some aspects, the lower dielectric layer structure comprises at least one signal layer comprising the power distribution arrangement, and at least one dielectric layer for each signal layer.

This provides an advantage of enabling a multilayer structure for a versatile power distribution arrangement.

According to some aspects, the upper dielectric layer structure is formed as a separate upper part and where the lower dielectric layer structure is formed as a separate lower part, where furthermore the upper dielectric layer structure is adapted to be surface-mounted to the lower dielectric layer structure.

This provides an advantage of enabling efficient manufacturing.

According to some aspects, the upper dielectric layer structure comprises upper feeding probe parts and a first lower conducting plane, and the lower layer structure comprises lower feeding probe parts and a second lower conducting plane.

This provides an advantage of enabling efficient manufacturing.

According to some aspects, a first distance between the lowest intermediate radiating patch and the lower conducting plane falls below a second distance between the upper radiating patch and a closest intermediate patch.

This provides an advantage of reduced undesired radiation from the feed.

Said object is also obtained by means of an array antenna arrangement comprising a plurality of antenna elements according to the above. The array antenna arrangement further comprises a feed assembly comprising the power distribution arrangements.

In this manner, all the advantages discussed above for an antenna element are applied for an array antenna.

This provides an advantage of enabling efficient manufacturing.

According to some aspects, each upper dielectric layer structure is formed as a separate upper part and where the lower dielectric layer structure is constituted by a common feeding arrangement, where a plurality of upper dielectric layer structures are adapted to be surface-mounted to the lower dielectric layer structure.

This provides an advantage of enabling efficient manufacturing.

According to some aspects, each upper dielectric layer structure comprises upper feeding probe parts and a first lower conducting plane, and the lower layer structure comprises lower feeding probe parts and a second lower conducting plane.

This provides an advantage of enabling efficient manufacturing.

According to some aspects each antenna element is adapted to be surface-mounted to a common dielectric layer structure.

Preferably, the common dielectric layer structure comprises a first conducting plane, a second conducting plane and a third conducting plane. The first conducting plane comprises a first ground plane, the second conducting plane comprises a feeding network and is separated from the first conducting plane by a first dielectric layer, and the third conducting plane comprises a second ground plane and is separated from the second conducting plane by a second dielectric layer. Each antenna element comprises a lower dielectric layer structure that comprises at least one upper feeding sub-probe part that is connected to the power distribution arrangements and the common dielectric layer structure comprises a lower feeding sub-probe part for each upper feeding sub-probe part. The lower feeding sub-probe parts are connected to the feeding network in the second conducting plane.

This provides an advantage of enabling an alternative efficient manufacturing.

Said object is also obtained by means of methods for manufacturing an array antenna arrangement according to the above, with the advantages mentioned.

BRIEF DESCRIPTION OF THE DRAWINGS

The present disclosure will now be described more in detail with reference to the appended drawings, where.

DETAILED DESCRIPTION

Figure 1:
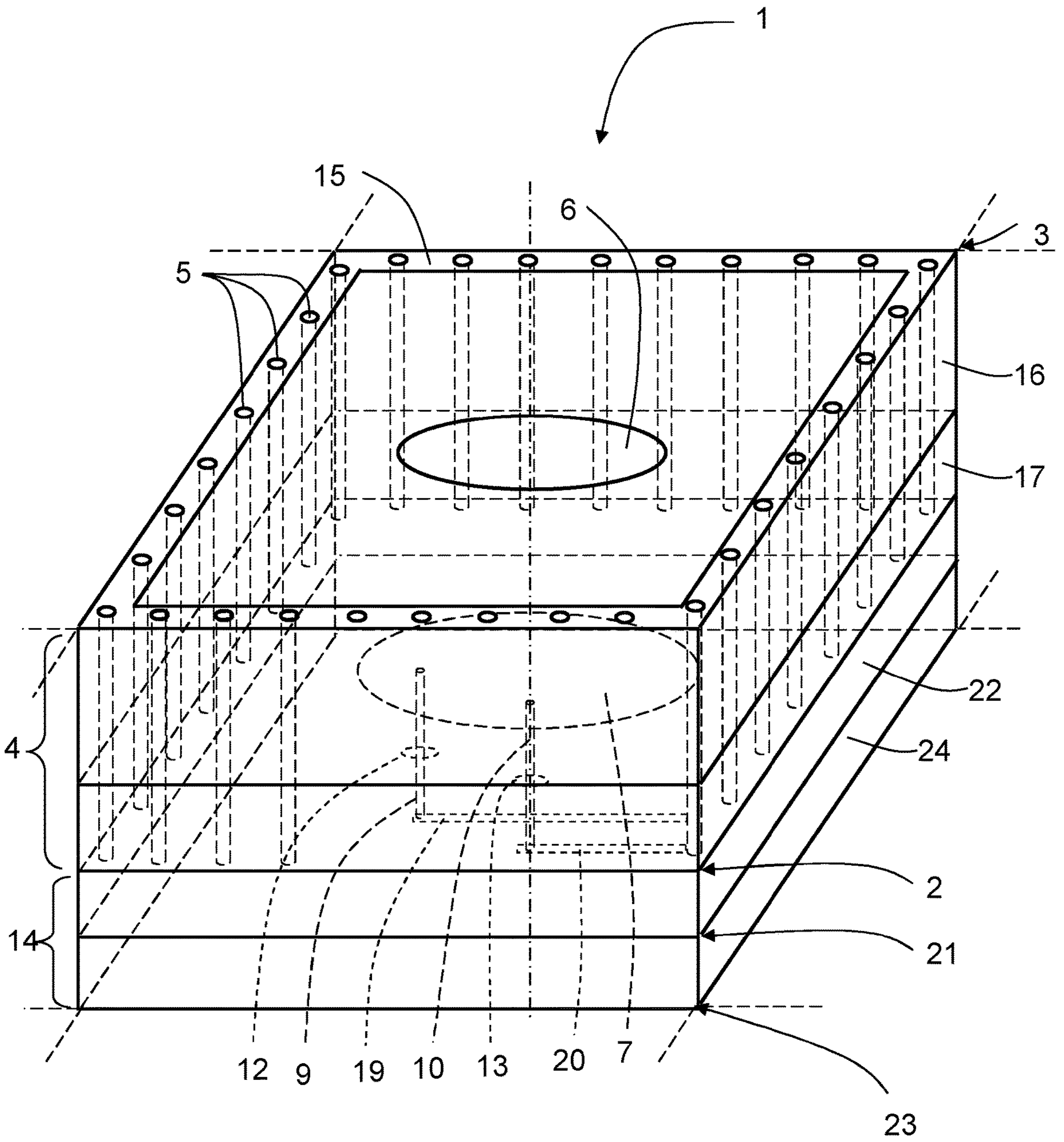
FIG. 1 shows a schematic perspective side view of a first example of a cavity-backed patch antenna element.
Figure 2:
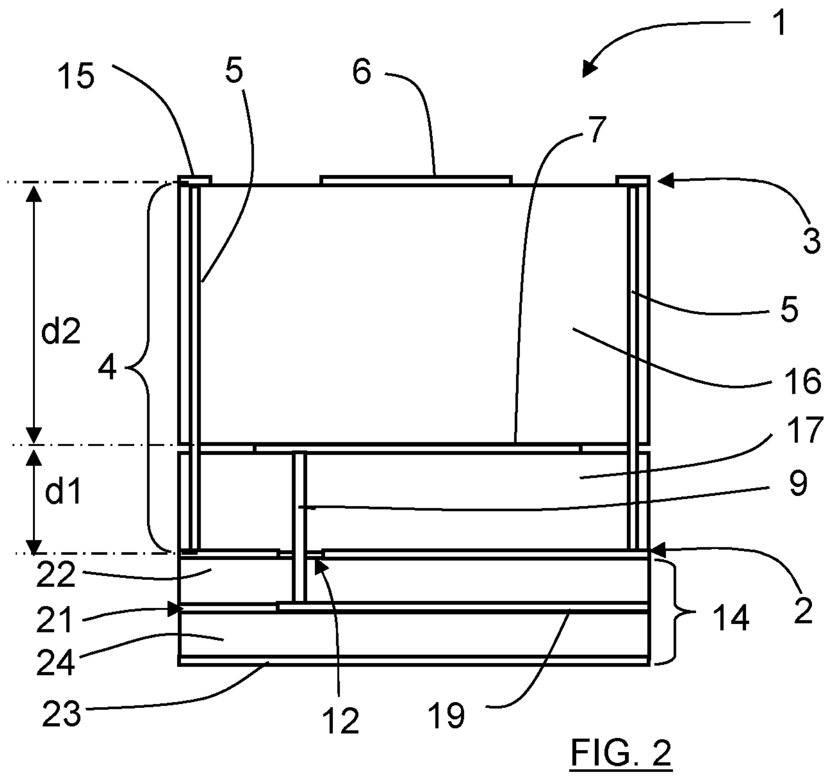
FIG. 2 shows a schematic cut-open side view of the first example of the cavity-backed patch antenna element.

With reference to FIG. 1, showing a perspective side view of a cavity-backed patch antenna element and FIG. 2, showing a schematic cut-open side view of the cavity-backed patch antenna element, a first example will now be described.

The antenna element 1 comprises a lower conducting plane 2, an upper conducting plane 3 and an upper dielectric layer structure 4 that is positioned between the conducting planes 2, 3, where the upper dielectric layer structure 4 comprises a plurality of conducting vias 5 (only a few indicated for reasons of clarity) that electrically connect the conducting planes 2, 3 to each other. The vias 5 circumvent an upper radiating patch 6 formed in the upper conducting plane 3, and a lowest intermediate radiating patch 7 that is formed in the upper dielectric layer structure 4, where the lowest intermediate radiating patch 7 is closer to the lower conducting plane 2 than the upper radiating patch 6. It is to be noted that all vias 5 are not shown in FIG. 1, there is a gap for reasons of clarity, but of course the vias 5 are intended to run evenly distributed and completely circumvent the patches 6, 7.

In this manner, a cavity is formed in the upper dielectric layer structure 4, being limited by the vias 5, where the lower conducting plane 2 constitutes a cavity floor. The cavity height and shape are tuning parameters, which may vary for different bandwidth requirements.

Between the patches 6, 7 there is an upper first dielectric layer 16, and between the lowest intermediate radiating patch 7 and the lower conducting plane 2 there is an upper second dielectric layer 17. According to some aspects, the upper conducting plane 3 comprises an electrically conducting frame 15 to which the vias 5 are connected.

According to the present disclosure, the lowest intermediate radiating patch 7 is connected to a feed arrangement that comprises a first feeding probe 9 and a second feeding probe 10, where the feeding probes 9, 10 extend via corresponding apertures 12, 13 in the lower conducting plane 2 and are electrically connected to the lowest intermediate radiating patch 7.

A power distribution arrangement 19, 20 (only schematically indicated) extends in a lower dielectric layer structure 14, where the lower conducting plane 2 is positioned between the upper dielectric layer structure 4 and the lower dielectric layer structure 14. The power distribution arrangement 19, 20 is adapted to feed the lowest intermediate radiating patch 7 with two orthogonal polarizations via the feeding probes 9, 10.

The lower dielectric layer structure 14 comprises a first signal layer 21, comprising the power distribution arrangement 19, 20 and a first lower dielectric layer 22. The lower dielectric layer structure 14 further comprises a bottom conducting plane 23 and a second lower dielectric layer 24 positioned between the bottom conducting plane 23 and the first signal layer 21. In this way, the first signal layer 21 is comprised in a stripline structure.

Here, the power distribution arrangement 19, 20 is shown to extend in one signal layer 21, but according to some aspects the lower dielectric layer structure 14 comprises several signal layers in which a power distribution arrangement extends.

Figure 5:
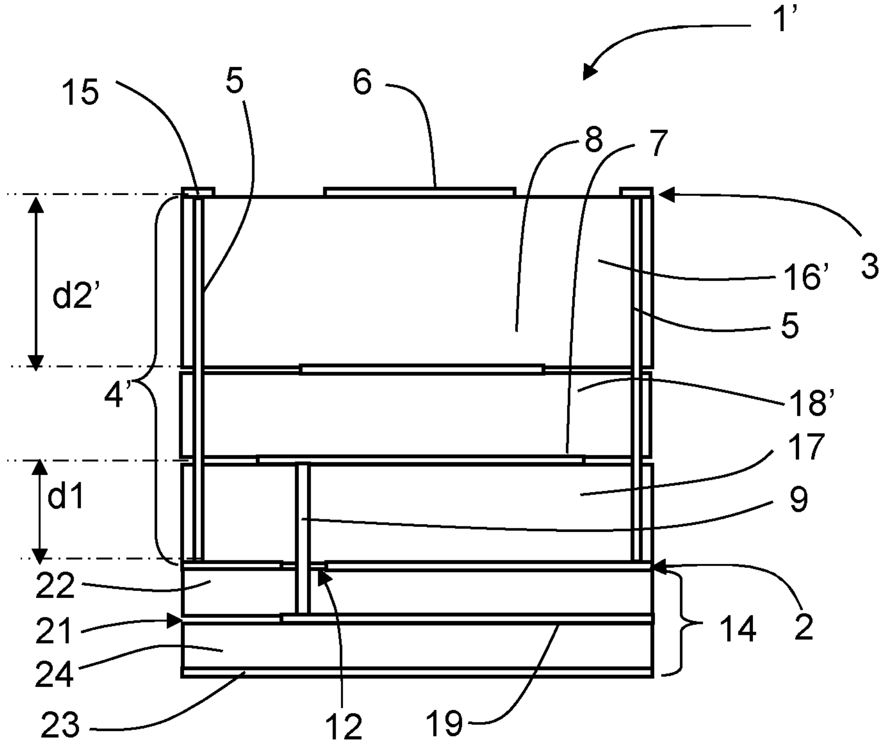
FIG. 5 shows a schematic cut-open side view of a second example of the cavity-backed patch antenna element.

According to some aspects, there can be one or more further intermediate radiating patches between the lowest intermediate radiating patch 7 and the upper radiating patch 6. With reference to FIG. 5, showing a schematic cut-open side view of a cavity-backed patch antenna element 1' according to a second example, there is an upper intermediate radiating patch 8 positioned between the lowest intermediate radiating patch 7 and the upper radiating patch 6 in an alternative upper dielectric layer structure 4'. Between the upper radiating patch 6 and the upper intermediate radiating patch 8 there is an upper first dielectric layer 16', and between the intermediate patches 7, 8 there is an upper third dielectric layer 18'.

In the present context, the term intermediate radiating patch relates to the fact that such a patch lies between the upper radiating patch 6 and the lower conducting plane 2.

According to some aspects, a first distance d1 between the lowest intermediate radiating patch 7 and the lower conducting plane 2 falls below a second distance d2, d2' between the upper radiating patch 6 and a closest intermediate patch 7, 8. The first distance d1 is preferably relatively small.

As indicated with dashed lines in FIG. 1, a plurality of antenna elements can be positioned side by side to form an array antenna as will be discussed below; alternatively the conducting layers 2, 3, 23 can continue as ground planes outside the antenna element structure shown.

Figure 3:
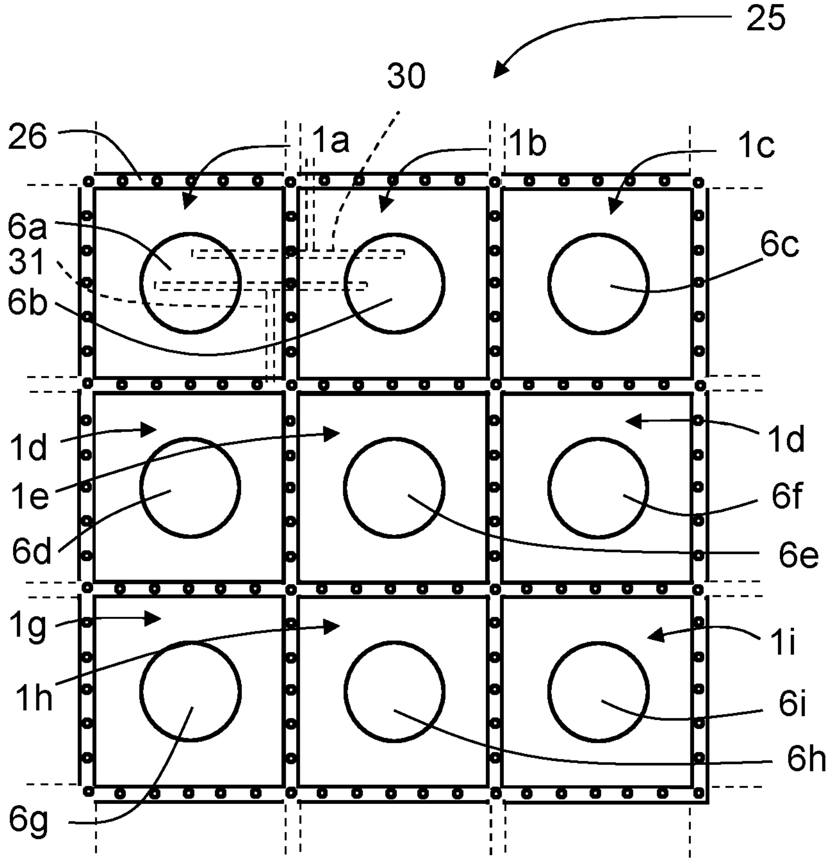
FIG. 3 shows a schematic top view of an array antenna arrangement.
Figure 4:
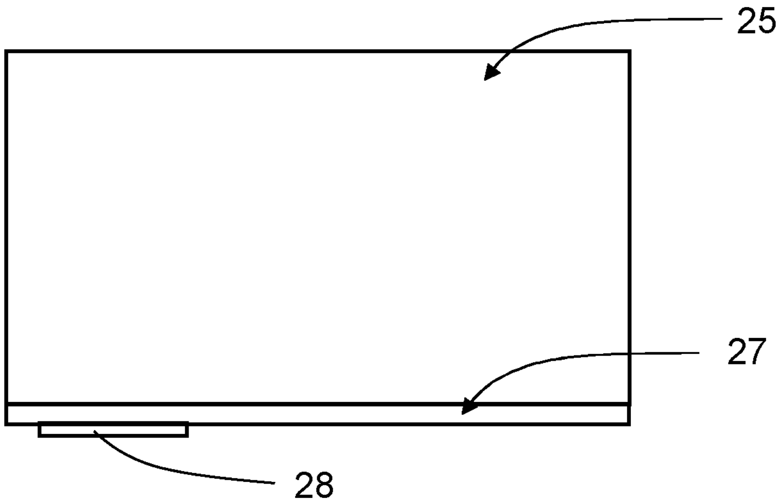
FIG. 4 shows a schematic side view of the array antenna arrangement.

With reference to FIG. 3, showing a top view of an array antenna arrangement, and FIG. 4, showing a side view of an array antenna arrangement, an array antenna arrangement 25 comprises a plurality of antenna elements 1*a*, 1*b*, 1*c*, 1*d*, 1*e*, 1*f*, 1*g*, 1*h*, 1*i* and a feed assembly 27 comprising corresponding power distribution arrangements 19, 20. The feed assembly 27 comprises a plurality of branches 30, 31 (only schematically indicated in FIG. 3), where each branch 30, 31 is adapted to feed two antenna elements 1*a*, 1*b*, such that each branch 30, 31 is adapted to feed a sub-array 1*a*, 1*b*. According to some aspects, the feed assembly 27 is connected to radio frequency, RF, circuitry 28.

According to some aspects, each branch 30, 31 is adapted to feed any number of antenna elements that will constitute a sub-array. As indicated with dashed lines in FIG. 3, the array antenna arrangement 25 can have any suitable size, comprising any number of antenna elements.

In FIG. 3, for each antenna element 1*a*, 1*b*, 1*c*, 1*d*, 1*e*, 1*f*, 1*g*, 1*h*, 1*i*, a corresponding upper radiating patch 6*a*, 6*b*, 6*c*, 6*d*, 6*e*, 6*f*, 6*g*, 6*h*, 6*i* is shown.

Figure 6:
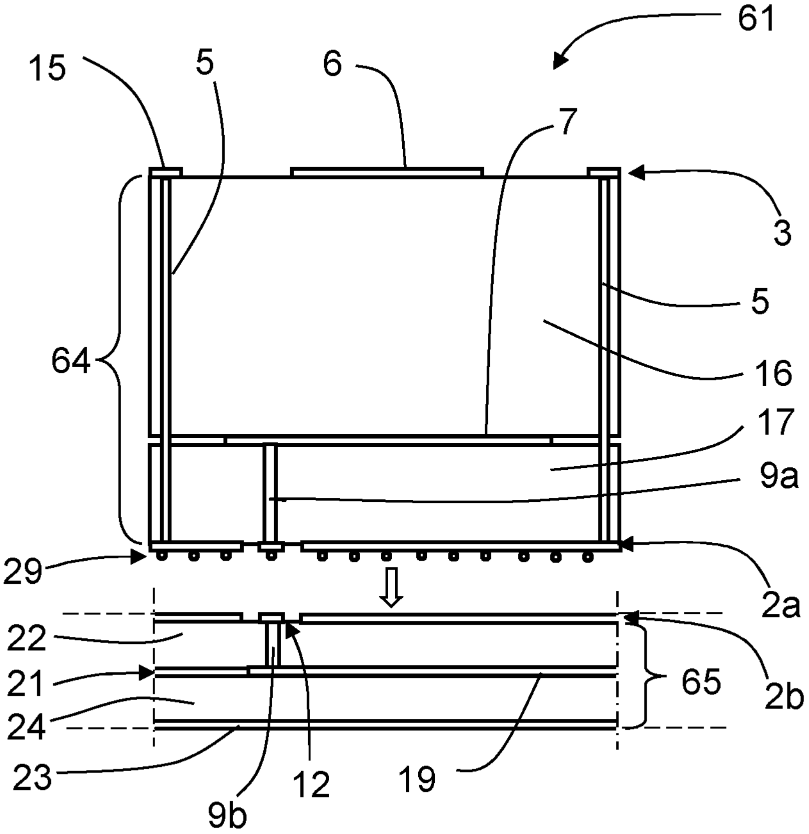
FIG. 6 shows a schematic cut-open side view of a third example of the cavity-backed patch antenna element.

According to some aspects, also with reference to FIG. 6 that shows a schematic cut-open side view of a cavity-backed patch antenna element 61 according to a third example, for each antenna element 61; 1*a*, 1*b*, 1*c*, 1*d*, 1*e*, 1*f*, 1*g*, 1*h*, 1*i*, each upper dielectric layer structure 64 is formed as a separate upper part and the lower dielectric layer structure 65 is constituted by a common feeding arrangement, where a plurality of upper dielectric layer structures 64 are adapted to be surface-mounted to the lower dielectric layer structure 65. As indicated with dashed lines in FIG. 6, the lower dielectric layer structure 65 extends in accordance with the extension of the array antenna arrangement 25.

For this purpose, each upper dielectric layer structure 64 comprises upper feeding probe parts 9*a* and a first lower conducting plane 2*a*, and the lower layer structure 65 comprises lower feeding probe parts 9*b* and a second lower conducting plane 2*b*. Furthermore, before surface-mounting takes place, a solder coating, conducting glue/epoxy or similar 29 is applied between the first lower conducting plane 2*a* and the second lower conducting plane 2*b*, in FIG. 6 the solder coating 29 is shown applied to the first lower conducting plane 2*a*. Of course, the solder coating 29 can be applied to the second lower conducting plane 2*b* instead.

Figure 8:
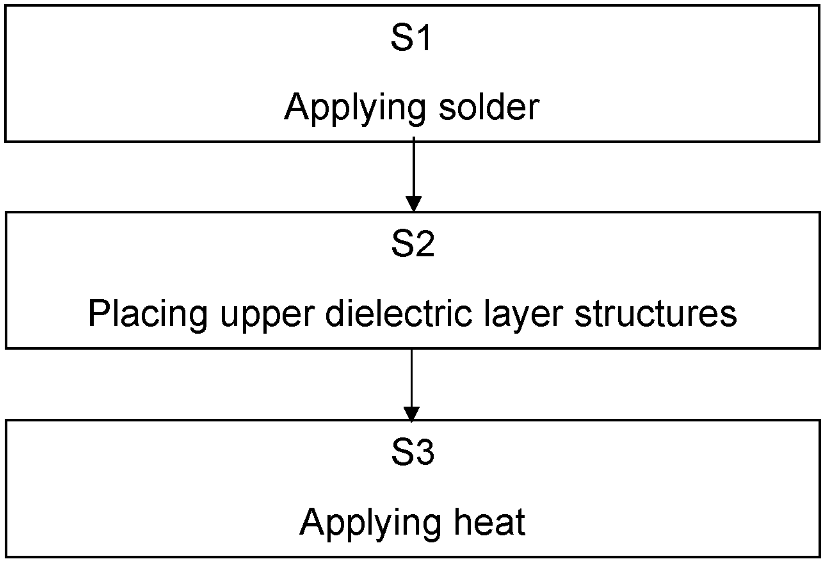
FIG. 8 shows a flowchart for a method according the present disclosure.

In view of the above, with reference to FIG. 3, FIG. 6 and FIG. 8, the present disclosure relates to a method for manufacturing an array antenna arrangement 25. For each antenna element 61; 1*a*, 1*b*, 1*c*, 1*d*, 1*e*, 1*f*, 1*g*, 1*h*, 1*i* in the array antenna arrangement 25, the method comprises:

Applying S1 a solder coating 29 between the first lower conducting plane 2*a* and the second lower conducting plane 2*b*.

Placing S2 an upper dielectric layer structure 64 on the lower layer structure 65.

Applying S3 heat such that the solder coating 29 melts.

Figure 7:
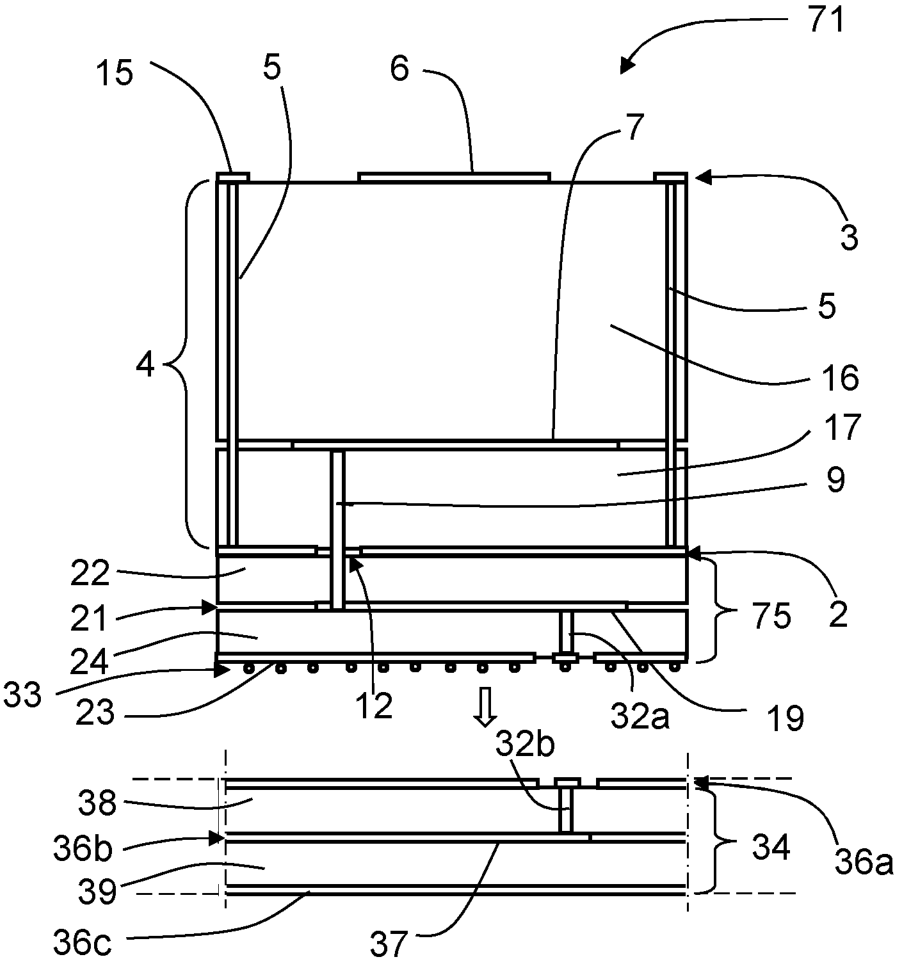
FIG. 7 shows a schematic cut-open side view of a fourth example of the cavity-backed patch antenna element.

Alternatively, according to some aspects and with reference to FIG. 3 and FIG. 7, where FIG. 7 shows a schematic cut-open side view of a cavity-backed patch antenna element 71 according to a fourth example, and a common dielectric layer structure 34, each antenna element 71; 1*a*, 1*b*, 1*c*, 1*d*, 1*e*, 1*f*, 1*g*, 1*h*, 1*i* is adapted to be surface-mounted to a common dielectric layer structure 34.

The common dielectric layer structure 34 comprises a first conducting plane 36*a*, a second conducting plane 36*b* and a third conducting plane 36*c*. The first conducting plane 36*a* comprises a first ground plane, the second conducting plane 36*b* constitutes a signal layer, comprises a feeding network 37 and is separated from the first conducting plane 36*a* by a first dielectric layer 38, and where the third conducting plane 36*c* comprises a second ground plane and is separated from the second conducting plane 36*b* by a second dielectric layer 39.

Each antenna element 71; 1*b*, 1*c*, 1*d*, 1*e*, 1*f*, 1*g*, 1*h*, 1*i* comprises a lower dielectric layer structure 75 that comprises at least one upper feeding sub-probe part 32*a* that is connected to the power distribution arrangements 19, 20. The common dielectric layer structure 34 comprises a lower feeding sub-probe part 32*b* for each upper feeding sub-probe part 32*a*, and the lower feeding sub-probe parts 32*b* are connected to the feeding network 37 in the second conducting plane 36*b*. As indicated with dashed lines in FIG. 7, the common dielectric layer structure 34 extends in accordance with the extension of the array antenna arrangement 25.

Furthermore, before surface-mounting takes place, a solder coating 33 is applied between the bottom ground plane 23 and the first conducting plane 36*a*; in FIG. 7 the solder coating 33 is shown applied to the bottom ground plane 23. Of course, the solder coating 33 can be applied to the first conducting plane 36*a* instead.

Here, the feeding network 37 is shown to extend in one signal layer in the form of the conducting plane 36*b*, but according to some aspects the common dielectric layer structure 34 comprises several conducting planes in which the feeding network extends.

Figure 9:
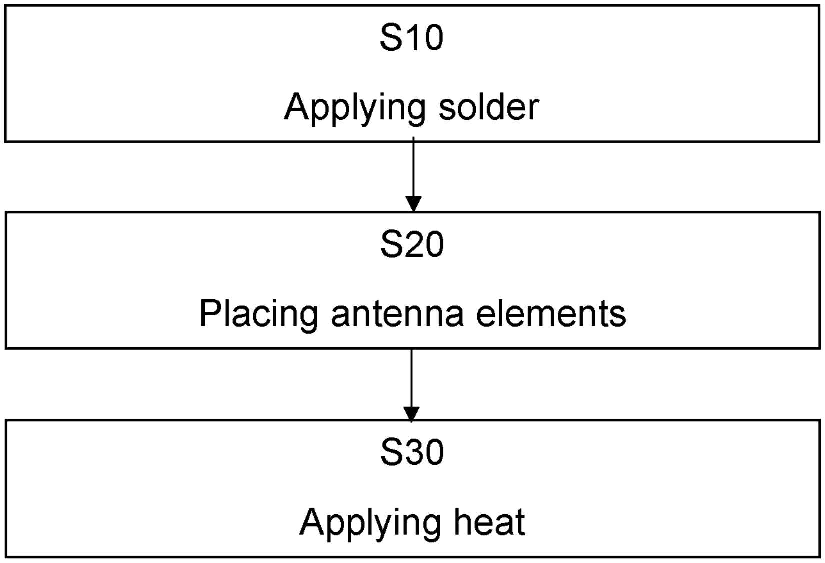
FIG. 9 shows a flowchart for a method according the present disclosure.

In view of the above, with reference to FIG. 3, FIG. 7 and FIG. 9, the present disclosure relates to a method for manufacturing an array antenna arrangement 25. The method comprises:

Applying S10 a solder coating 33 between a bottom ground plane 23 of the lower dielectric layer structure 75 of the antenna elements 71; 1*a*, 1*b*, 1*c*, 1*d*, 1*e*, 1*f*, 1*g*, 1*h*, 1*i* and the first ground plane in the first conducting plane 36*a*.

Placing S20 the antenna elements 71; 1*a*, 1*b*, 1*c*, 1*d*, 1*e*, 1*f*, 1*g*, 1*h*, 1*i* on the common dielectric layer structure 34.

Applying S30 heat such that the solder coating 33 melts.

The present disclosure is not limited to the above, but may vary within the scope of the appended claims. For example, according to some aspects, the lower dielectric layer structure 14 comprises the first signal layer 21, and the first lower dielectric layer 22 only, the first signal layer 21 being comprised in a microstrip structure.

The antenna is made up by at least two grounded metal planes that are interconnected by via holes, were the lower plane constitutes the cavity floor while the top plane includes an aperture opening.

Each dielectric layer can according to some aspects comprise two or more sub-layers, where two or more sub-layers in a dielectric layer can be made in different dielectric materials. Each sub-layer can be grounded by means of the vias 5.

The shape of cavity and/or the patch are not restricted to rectangular or circular shapes, but other shapes are of course possible such as hexagonal shapes, octagonal shapes etc. The patches in each antenna element 1 can according to some aspects have different mutual sizes and/or shapes.

Although not illustrated, the power distribution arrangement 19, 20 can be surrounded by vias in order to suppress undesired radiation from the power distribution arrangement 19, 20.

The manufacture of an array antenna by means of surface-mounting described above with reference to FIG. 6 can according to some aspects be applied to individual antenna elements. In that case, as shown in FIG. 6, the upper dielectric layer structure 64 is formed as a separate upper part and the lower dielectric layer structure 65 is formed as a separate lower part. In FIG. 6 it is indicated with dashed lines that the lower dielectric layer structure 65 continues, as is the case for an array antenna, but for an individual antenna element 61 the lower dielectric layer structure 65 matches the upper dielectric layer structure 64.

The upper dielectric layer structure 64 is adapted to be surface-mounted to the lower dielectric layer structure 65 and comprises upper feeding probe parts 9*a* and a first lower conducting plane 2*a*. The lower layer structure 65 comprises lower feeding probe parts 9*b* and a second lower conducting plane 2*b*.

According to some aspects, one antenna element or a group of antenna elements can be manufactures as described with reference to FIG. 6 and FIG. 8. A plurality of such antenna elements or groups of antenna elements can then be assembled to form an array antenna as described above with reference to FIG. 7 and FIG. 9.

In FIG. 2, FIG. 5, FIG. 6, and FIG. 7, which each show a schematic cut-open side view of a cavity-backed patch antenna element, only one probe element 9; 9*a*, 9*b* is shown although there are two probe elements.

According to some aspects, each antenna element 1 is single polarized and only comprises one probe element. Alternately, the each antenna element 1 comprises four probe elements that symmetrically feed the lowest intermediate radiating patch 7. In the case of more than one probe element, each antenna element 1 is adapted for either dual polarization or circular polarization.

According to some aspects, the upper radiating patch 6 is formed in, below or above the upper conducting plane 3.

Having the lowest intermediate radiating patch 7 positioned relatively close to the lower conducting plane 2 and the upper radiating patch in or near an aperture plane formed in the upper conducting plane is twofold. Firstly, the radiation from the feed probes is reduced, which results in a more symmetrical and better antenna radiation characteristic. Secondly, the cross-polarization radiation performance is significantly improved.

The power distribution layer is according to some aspects connected to further layers where routing and connections to radio components and/or ASIC: s (Application Specific Integrated Circuits) can be obtained.

Terms like orthogonal are not intended to be interpreted as mathematically exact, but as within what is practically obtainable in the present context.

Generally, the present disclosure relates to an antenna element 1 comprising a lower conducting plane 2, an upper conducting plane 3 and an upper dielectric layer structure 4 that is positioned between the conducting planes 2, 3, where the upper dielectric layer structure 4 comprises a plurality of conducting vias 5 that electrically connect the conducting planes 2, 3 to each other and circumvent an upper radiating patch 6 formed in, below or above the upper conducting plane 3, where the conducting vias 5 circumvent at least one intermediate radiating patch 7, 8 that is formed in the upper dielectric layer structure 4, wherein a lowest intermediate radiating patch 7 that is closest to the lower conducting plane 2 is connected to a feed arrangement 9, 10 that comprises at least one feeding probe 9, 10 that extends via a corresponding aperture 13 in the lower conducting plane 2 and is electrically connected to the lowest intermediate radiating patch 7.

According to some aspects, the upper dielectric structure 4 comprises a separate dielectric layer 16, 17, 18 formed for each radiating patch 6, 7, 8.

According to some aspects, the upper conducting plane 3 comprises an electrically conducting frame 15 to which the vias 5 are connected.

According to some aspects, each feed arrangement is connected to a power distribution arrangement 19, 20 that extends in a lower dielectric layer structure 14, where the lower conducting plane 2 is positioned between the upper dielectric layer structure 4 and the lower dielectric layer structure 14.

According to some aspects, the lower dielectric layer structure 14 comprises at least one signal layer 21 comprising the power distribution arrangement 19, 20, and at least one dielectric layer 22 for each signal layer 21.

According to some aspects, the lower dielectric layer structure 14 comprises a bottom conducting plane 23 and at least one dielectric layer 24 positioned between the bottom conducting plane 23 and the closest signal layer 21.

According to some aspects, the upper dielectric layer structure 64 is formed as a separate upper part and where the lower dielectric layer structure 65 is formed as a separate lower part, where furthermore the upper dielectric layer structure 64 is adapted to be surface-mounted to the lower dielectric layer structure 65.

According to some aspects, the upper dielectric layer structure 64 comprises upper feeding probe parts 9*a* and a first lower conducting plane 2*a*, and the lower layer structure 65 comprises lower feeding probe parts 9*b* and a second lower conducting plane 2*b*.

According to some aspects, a first distance d1 between the lowest intermediate radiating patch 7 and the lower conducting plane 2 falls below a second distance d2, d2' between the upper radiating patch 6 and a closest intermediate patch 7, 8.

Generally, the present disclosure also relates to an array antenna arrangement 25 comprising a plurality of antenna elements 1*a*, 1*b*, 1*c*, 1*d*, 1*e*, 1*f*, 1*g*, 1*h*, 1*i* according to any one of the claims 1-9, wherein the array antenna arrangement 25 further comprises a feed assembly 27 comprising the power distribution arrangements 19, 20.

According to some aspects, the feed assembly 27 comprises a plurality of branches 30, 31, where each branch is adapted to feed at least two antenna elements 1*a*, 1*b*, such that each branch 30, 31 is adapted to feed a sub-array 1*a*, 1*b*.

According to some aspects, the feed assembly 27 is connected to radio frequency, RF, circuitry 28.

According to some aspects, each upper dielectric layer structure 64 is formed as a separate upper part and where the lower dielectric layer structure 65 is constituted by a common feeding arrangement, where a plurality of upper dielectric layer structures 64 are adapted to be surface-mounted to the lower dielectric layer structure 65.

According to some aspects, each upper dielectric layer structure 64 comprises upper feeding probe parts 9*a* and a first lower conducting plane 2*a*, and the lower layer structure 65 comprises lower feeding probe parts 9*b* and a second lower conducting plane 2*b*.

According to some aspects, each antenna element 71; 1*a*, 1*b*, 1*c*, 1*d*, 1*e*, 1*f*, 1*g*, 1*h*, 1*i* is adapted to be surface-mounted to a common dielectric layer structure 34.

According to some aspects, the common dielectric layer structure 34 comprises a first conducting plane 36*a*, a second conducting plane 36*b* and a third conducting plane 36*c*, where the first conducting plane 36*a* comprises a first ground plane, the second conducting plane 36*b* comprises a feeding network 37 and is separated from the first conducting plane 36*a* by a first dielectric layer 38, and where the third conducting plane 36*c* comprises a second ground plane and is separated from the second conducting plane 36*b* by a second dielectric layer 39, where furthermore each antenna element 71; 1*b*, 1*c*, 1*d*, 1*e*, 1*f*, 1*g*, 1*h*, 1*i* comprises a lower dielectric layer structure 75 that comprises at least one upper feeding sub-probe part 32*a* that is connected to the power distribution arrangements 19, 20 and where the common dielectric layer structure 34 comprises a lower feeding sub-probe part 32*b* for each upper feeding sub-probe part 32*a*, where the lower feeding sub-probe parts 32*b* are connected to the feeding network 37 in the second conducting plane 36*b*.

The invention claimed is:

1. An antenna element comprising:

a lower conducting plane;

an upper conducting plane;

an upper dielectric layer structure positioned between the conducting planes, wherein the upper dielectric layer structure comprises a plurality of conducting vias that electrically connect the conducting planes to each other and circumvent an upper radiating patch formed in, below, or above the upper conducting plane, the conducting vias circumvent at least one intermediate radiating patch that is formed in the upper dielectric layer structure, and a lowest intermediate radiating patch that is closest to the lower conducting plane is connected to a feed arrangement that comprises at least one feeding probe that extends via a corresponding aperture in the lower conducting plane and is electrically connected to the lowest intermediate radiating patch.

2. The antenna element of claim 1, wherein the upper dielectric structure comprises a separate dielectric layer formed for each radiating patch.

3. The antenna element of claim 1, wherein the upper conducting plane comprises an electrically conducting frame to which the vias are connected.

4. The antenna element of claim 1, wherein each feed arrangement is connected to a power distribution arrangement that extends in a lower dielectric layer structure, where the lower conducting plane is positioned between the upper dielectric layer structure and the lower dielectric layer structure.

5. The antenna element of claim 4, wherein the lower dielectric layer structure comprises at least one signal layer comprising the power distribution arrangement, and at least one dielectric layer for each signal layer.

6. The antenna element of claim 5, wherein the lower dielectric layer structure comprises a bottom conducting plane and at least one dielectric layer positioned between the bottom conducting plane and the closest signal layer.

7. The antenna element of claim 4, wherein the upper dielectric layer structure is formed as a separate upper part and where the lower dielectric layer structure is formed as a separate lower part, where furthermore the upper dielectric layer structure is adapted to be surface-mounted to the lower dielectric layer structure.

8. The antenna element of claim 7, wherein the upper dielectric layer structure comprises upper feeding probe parts and a first lower conducting plane, and the lower layer structure comprises lower feeding probe parts and a second lower conducting plane.

9. The antenna element of claim 1, wherein a first distance between the lowest intermediate radiating patch and the lower conducting plane falls below a second distance between the upper radiating patch and a closest intermediate patch.

10. An antenna arrangement comprising a plurality of antenna elements, the plurality of antenna elements comprising the antenna element of claim 1, wherein the antenna arrangement further comprises a feed assembly comprising a power distribution arrangement.

11. The antenna arrangement of claim 10, wherein the feed assembly comprises a plurality of branches, where each branch is adapted to feed at least two antenna elements, such that each branch is adapted to feed a sub-array.

12. The antenna arrangement of claim 10, wherein the feed assembly is connected to radio frequency (RF) circuitry.

13. The array antenna arrangement of claim 10, wherein each upper dielectric layer structure is formed as a separate upper part and where the lower dielectric layer structure is constituted by a common feeding arrangement, where a plurality of upper dielectric layer structures are adapted to be surface-mounted to the lower dielectric layer structure.

14. The antenna arrangement of claim 13, wherein each upper dielectric layer structure comprises upper feeding probe parts and a first lower conducting plane, and the lower layer structure comprises lower feeding probe parts and a second lower conducting plane.

15. The antenna arrangement of claim 10, wherein each antenna element is adapted to be surface-mounted to a common dielectric layer structure.

16. The antenna arrangement of claim 15, wherein the common dielectric layer structure comprises a first conducting plane, a second conducting plane and a third conducting plane, where the first conducting plane comprises a first ground plane, the second conducting plane comprises a feeding network and is separated from the first conducting plane by a first dielectric layer, and where the third conducting plane comprises a second ground plane and is separated from the second conducting plane by a second dielectric layer, where furthermore each antenna element comprises a lower dielectric layer structure that comprises at least one upper feeding sub-probe part that is connected to the power distribution arrangements and where the common dielectric layer structure comprises a lower feeding sub-probe part for each upper feeding sub-probe part, where the lower feeding sub-probe parts are connected to the feeding network in the second conducting plane.

17. A method for manufacturing the antenna arrangement of claim 14, wherein, for each antenna element in the antenna arrangement, the method comprises:

applying a solder coating between the first lower conducting plane and the second lower conducting plane;

placing an upper dielectric layer structure on the lower layer structure; and applying heat such that the solder coating melts.

18. A method for manufacturing the antenna arrangement of claim 16, wherein the method comprises:

applying a solder coating between the bottom ground plane of the lower dielectric layer structure of the antenna elements and the first ground plane in the first conducting plane;

placing the antenna elements on the common dielectric layer structure; and applying heat such that the solder coating melts.

* * * * *